(12) United States Patent
Lomasney et al.

(10) Patent No.: US 11,536,311 B2
(45) Date of Patent: Dec. 27, 2022

(54) INTEGRATED POST-WELD KNURLING PROCESS AND DEVICE FOR PERFORMING THE SAME

(71) Applicant: NEAPCO INTELLECTUAL PROPERTY HOLDINGS, LLC, Farmington Hills, MI (US)

(72) Inventors: Michael Leo Lomasney, China Township, MI (US); Patrick James Mulrooney, Commerce Township, MI (US); Ryan Thomas Woods, Walled Lake, MI (US); Gregory Allen Miller, Northville, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 1331 days.

(21) Appl. No.: 15/914,486

(22) Filed: Mar. 7, 2018

(65) Prior Publication Data
US 2018/0258980 A1 Sep. 13, 2018

Related U.S. Application Data

(60) Provisional application No. 62/467,988, filed on Mar. 7, 2017.

(51) Int. Cl.
| | |
|---|---|
| *B23K 20/12* | (2006.01) |
| *F16C 3/02* | (2006.01) |
| *F16B 7/00* | (2006.01) |
| *B23K 37/08* | (2006.01) |
| *B23K 31/12* | (2006.01) |
| *B23K 9/08* | (2006.01) |

(Continued)

(52) U.S. Cl.
CPC ............... *F16C 3/023* (2013.01); *B21H 7/14* (2013.01); *B23K 9/0282* (2013.01); *B23K 9/08* (2013.01); *B23K 20/12* (2013.01); *B23K 31/12* (2013.01); *B23K 37/08* (2013.01); *F16B 7/00* (2013.01); *F16C 2226/36* (2013.01)

(58) Field of Classification Search
CPC .... B23K 20/12; B23K 20/121; B23K 20/129; B23K 37/08
See application file for complete search history.

(56) References Cited

U.S. PATENT DOCUMENTS

| | | | | |
|---|---|---|---|---|
| 5,906,694 | A * | 5/1999 | Duly ...................... | B23K 20/12 |
| | | | | 156/580.2 |
| 9,713,854 | B2 * | 7/2017 | Zhai ..................... | B23K 20/129 |
| 2003/0197047 | A1 * | 10/2003 | Kanzaki ................ | B23K 20/12 |
| | | | | 228/2.1 |

\* cited by examiner

*Primary Examiner* — Daniel J Wiley
(74) *Attorney, Agent, or Firm* — Shumaker, Loop & Kendrick, LLP; James D. Miller

(57) ABSTRACT

A system for manufacturing a drive shaft assembly comprises a welding apparatus configured to weld a tube to an end fitting to form the drive shaft assembly having an annular weld. A transport apparatus is configured to transport the drive shaft assembly away from the welding apparatus. A knurling apparatus receives the drive shaft assembly from the transport apparatus. The knurling apparatus is configured to knurl the weld of the drive shaft assembly. The knurling apparatus includes a pair of knurling plates having textured surfaces in facing relationship. One of the knurling plates is configured to move relative to the other of the knurling plates to roll the drive shaft assembly between the textured surfaces, thereby knurling the weld to improve an appearance and texture of the outer surface of the drive shaft assembly.

6 Claims, 8 Drawing Sheets

(51) Int. Cl.
*B21H 7/14* (2006.01)
*B23K 9/028* (2006.01)

INTEGRATED POST-WELD KNURLING PROCESS AND DEVICE FOR PERFORMING THE SAME

CROSS-REFERENCE TO RELATED APPLICATION

This patent application claims priority to U.S. Provisional Patent Application Ser. No. 62/467,988, filed Mar. 7, 2017, the entire disclosure of which is hereby incorporated herein by reference.

FIELD OF THE INVENTION

The present invention relates to a knurling process and device for removing and minimizing welding imperfections formed during a welding operation.

BACKGROUND OF THE INVENTION

In many applications, welding methods are employed to join shaft tubes, such as propeller shaft tubes or drive shaft tubes for drive shaft assemblies of vehicles, to various end fittings. The welding methods include, but are not limited to, rotary friction welding and magnetically impelled arc butt welding. The joining of the tubes to the end fittings causes a weld upset or weld curl to form at a welded joint interface. The weld curl protrudes radially outwardly from the welded joint interface. Typically, the weld curl may include objectionable features. For example, the features can be jagged and may include partially attached contaminants such as metal shavings and/or stringers formed during the welding process, as shown in FIG. 10, which illustrates a weld joint interface having a weld curl with examples of the objectionable features. The jagged weld curl and resulting contaminants can be sharp and can further affect the perceived quality of the drive shaft assembly. These features can be especially problematic for assemblers of the drive shaft assembly and manufacturers of the vehicles utilizing the drive shaft assembly.

Various methods have been attempted to remove the sharp weld curls, shavings, and stringers. These methods include wire brushing the weld curl and shearing of the weld curl after completion of the welding operation. However, these methods have proven to be impractical, ineffective, and/or costly.

Accordingly, it would be desirable to provide a driveshaft assembly with knurled or reformed weld curls and to provide a device and method that efficiently and effectively minimizes and/or removes undesirable features formed by a weld curl during a welding operation.

SUMMARY OF THE INVENTION

Compatible and attuned with the present invention, a driveshaft assembly with knurled or reformed weld curls and a device and method that efficiently and effectively minimizes and/or removes undesirable features formed by a weld curl during a welding operation has surprisingly been discovered.

In one embodiment of the invention, a system for manufacturing a drive shaft assembly including a first drive shaft component welded to a second drive shaft component at a weld comprises a knurling apparatus configured to knurl an outer surface of the weld of the drive shaft assembly. The knurling apparatus includes a pair of knurling plates. A first one of the knurling plates has a first textured surface and a second one of the knurling plates has a second textured surface. The first textured surface is in facing relationship with the second textured surface.

A method of manufacturing a drive shaft assembly is also disclosed. The method comprises the steps of welding a first drive shaft component to a second drive shaft component to form a drive shaft assembly having a weld at an interface between the first drive shaft component and the second drive shaft component; and knurling an outer surface of the weld formed between the first drive shaft component and the second drive shaft component.

A novel drive shaft assembly is also disclosed. The drive shaft assembly includes a first drive shaft component and a second drive shaft component welded to the first drive shaft component at a weld joint interface, wherein the weld joint interface includes a weld curl having a knurled outer surface.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

Figure 1:
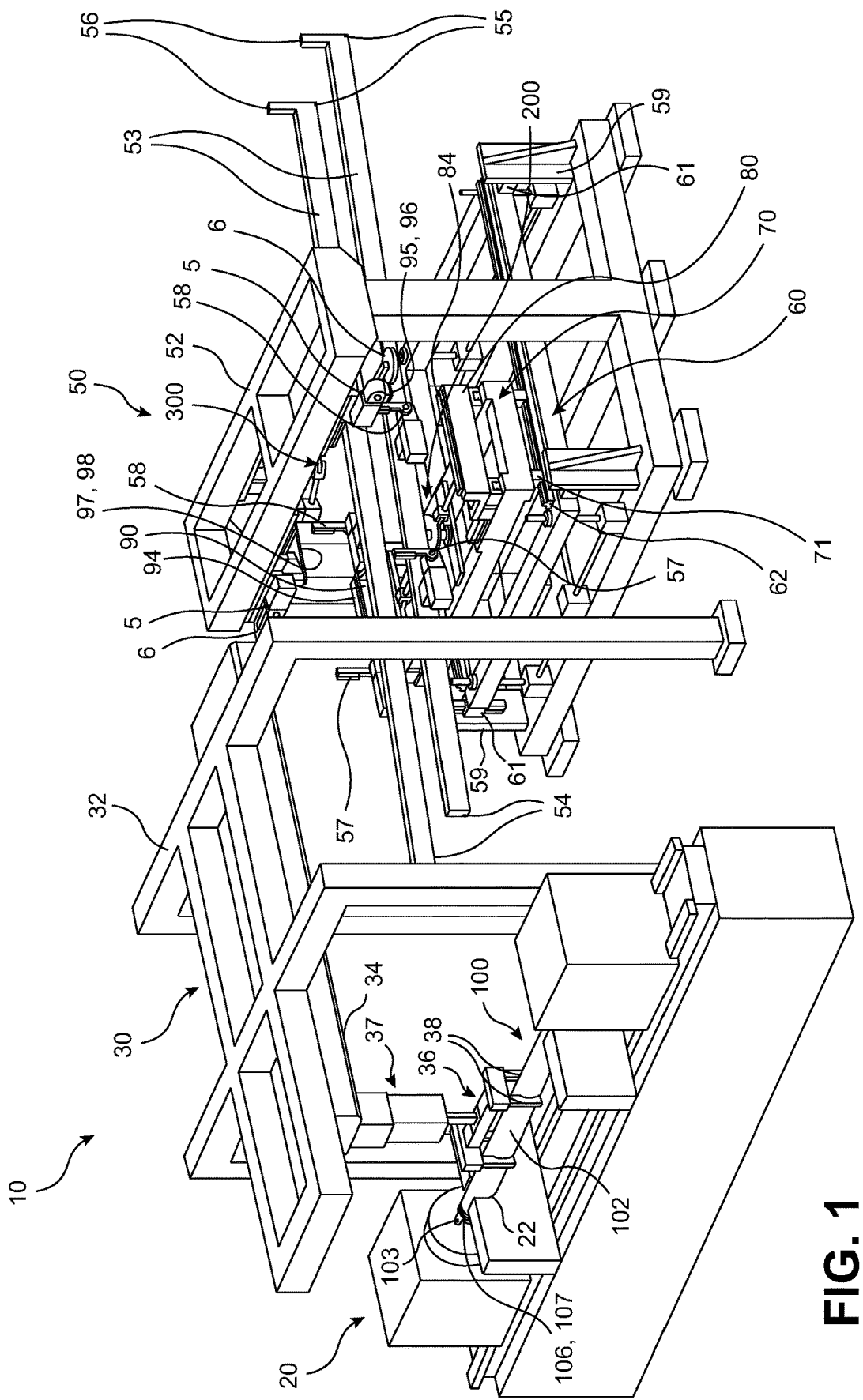
FIG. 1 is a perspective view of an integrated welding and knurling system according to an embodiment of the invention, wherein a welding apparatus of the integrated welding and knurling system is performing a welding operation for forming a drive shaft assembly.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-9 illustrate an integrated welding and knurling system 10 according to an embodiment of the invention. The system 10 is configured to at least partially assemble a drive shaft assembly 100 via a welding operation before subsequently conducting a knurling operation with respect to the drive shaft assembly 100. The knurling operation beneficially forms an attractive weld joint interface that is also devoid of objectionable surface features formed as a result of the welding operation such as shavings, abrasive projections, and the like.

The system 10 may be automated to allow for welding and knurling operations to be conducted simultaneously on multiple independent work pieces. It is understood the system 10 can be entirely automated or only portions thereof can be automated, as desired, for carrying out a desired application using the system 10. As such, the system 10 may be in signal communication with one or more controllers (not shown) configured for automatically operating aspects of the system 10 or the system 10 may include an appropriate user interface for supplying user commands to the system 10. The system 10 may include sensing devices for determining a condition of the system 10 or an associated workpiece, wherein the sensors are in signal communication with at least one of the controllers. One skilled in the art should appreciate that the system 10 may be adapted to perform each step of the dual welding and knurling operation at any desired timing and in response to any given set of circumstances in accordance with varying applications of the system 10. For example, the system 10 may be adapted for assembling drive shaft assemblies having variable dimensions or constituent materials, thereby requiring adjustment of the system 10 to account for changes in timing such as a change in the time required to perform a desired welding operation or a desired knurling operation.

The system 10 generally comprises a welding apparatus 20, a transport apparatus 30, and a knurling apparatus 50. The welding apparatus 20 may be any mechanism suitable for performing a welding operation at a seam formed between two cylindrical members as is required for assembly of the drive shaft assembly 100. The welding operation may be, for example, a forge welding technique. In the embodiment illustrated, the welding operation is a rotary friction welding operation performed by a rotary friction weld mechanism. However, it is understood the welding operation can be a magnetically impelled arc butt welding operation or other suitable welding operation, as desired. Alternatively, in addition to a welding operation, the system 10 may be further adapted for use in association with any manufacturing process resulting in an undesirable surface finish at or adjacent a seam formed between two mechanically joined components, as desired.

The drive shaft assembly 100 includes a central tube 102 that is cylindrical in shape and extends longitudinally from a first end to a second end thereof. As shown in FIG. 1, a locating feature 22 of the welding apparatus 20 orients the tube 102 to extend longitudinally in a direction perpendicular to a general direction of travel of the drive shaft assembly 100 as it travels from the welding apparatus 20 to the knurling apparatus 50. The tube 102 may be formed from a steel, a steel alloy, an aluminum, or an aluminum alloy by an extrusion process, a rolling process, or a welding and drawing process, as non-limiting examples. It is understood that the tube 102 may be formed by other materials or processes without departing from the scope of the present invention.

Each end of the tube 102 is configured for coupling to a corresponding end fitting 103. Each of the end fittings 103 may be any type of end fitting suitable for forming a drive shaft assembly such as a joint yoke, a splined shaft, a constant velocity joint, or any other known feature commonly employed with drive shaft assemblies. Each type of end fitting 103 further includes a cylindrical portion at an end thereof having a substantially similar shape and size as the tube 102 to allow for each of the end fittings 103 to be coupled to one of the ends of the tube 102.

Figure 10:
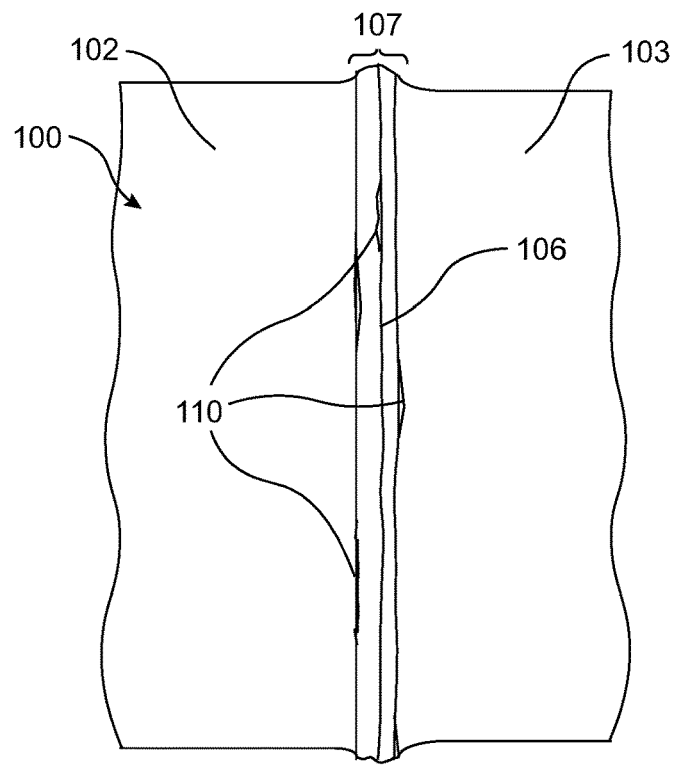
FIG. 10 is a fragmentary side elevational view of a weld curl of a drive shaft assembly having objectionable surface features following a welding operation.

As shown in FIG. 10, a welding operation for coupling one of the end fittings 103 to an end of the tube 102 may result in an annular seam 106 formed within an annular weld curl 107, wherein the weld curl 107 may form a radially outwardly projecting portion of the drive shaft assembly 100. The weld curl 107 is illustrated in FIG. 10 as including various objectionable features 110 such as abrasive surfaces, irregular surfaces, shavings, stringers, and the like.

The transport apparatus 30 is shown as including a frame 32 and a transport rail 34 depending from an underside of the frame 32. The transport rail 34 extends horizontally between the welding apparatus 20 and the knurling apparatus 50, wherein the direction of extension of the transport rail 34 is hereafter referred to as the first horizontal direction. The frame 32 extends above and over at least a portion of the welding apparatus 20 and the knurling apparatus 50. A gripping device 36 slidably depends from the transport rail 34 and is movable in the first horizontal direction. A vertical displacement mechanism 37 is configured to adjust a vertical position of the gripping device 36 relative to the transport rail 34. The gripping device 36 accordingly has at least two degrees of freedom when repositioning the drive shaft assembly 100 relative to the knurling apparatus 50 after removing the drive shaft assembly 100 from the locating feature 22 of the welding apparatus 20.

The gripping device 36 includes two pairs of gripping claws 38 for grasping opposing side surfaces of the tube 102 of the drive shaft assembly 100. The gripping device 36 may be configured to open and close by a widening or narrowing of a gap present between opposing ones of the gripping claws 38. The gripping claws 38 may further include a substantially concave rounded inner surface corresponding to the contour of at least a portion of an outer surface of the tube 102 to ensure adequate gripping and a proper positioning of the tube 102 within the gripping device 36 during transport of the drive shaft assembly 100.

One or more actuators may be employed for controlling a horizontal position of the gripping device 36 relative to the transport rail 34, a vertical position of the gripping device 36 relative to the transport rail 34, and a gripping position of the gripping claws 38. The actuators may be motors configured to translate rotational motion to linear translational motion using any known kinematic relationship, pneumatic actuators, hydraulic actuators, or other actuators as desired. For example, the horizontal displacement of the gripping device 36 along the transport rail 34 may be accomplished by any conveyer system such as a conveyer belt, lead screw conveyer system, or other conveying device, as desired. One skilled in the art should appreciate that any suitable system for controlling the vertical and horizontal position of the gripping device 36 may be selected without departing from the scope of the present invention.

In some embodiments, the transport apparatus 30 may instead be in the form of a multi-axis robot (not shown)

having suitable manipulators and degrees of freedom for gripping and removing one of the drive shaft assemblies 100 from the locating feature 22 of the welding apparatus 20 and transporting the one of the drive shaft assemblies 100 towards an appropriate position relative to the knurling apparatus 50. The use of a multi-axis robot such as a 6-axis robot or a 7-axis robot provides the benefit of allowing for the system 10 to be arranged in various orientations and configurations based on the added degrees of freedom of such a multi-axis robot in comparison to the transport apparatus 30 described hereinabove. For example, in contrast to the configuration shown in FIG. 1, the multi-axis robot may be able to grip and remove one of the drive shaft assemblies 100 originating from the welding apparatus 20 even if the welding apparatus is turned 90 degrees away from the position shown. In this respect, a space occupied by the system 10 may be reduced by allowing for a rearranging of the relevant components forming the welding apparatus 20 and the knurling apparatus 50.

The knurling apparatus 50 includes a frame 52 supporting a pair of gravity bars 53. The gravity bars 53 are oriented at an incline to extend at least partially downward as each of the gravity bars 53 extends from a first end 54 adjacent the welding apparatus 20 to an opposing second end 55. The inclination of the gravity bars 53 causes a drive shaft assembly 100 disposed on the gravity bars 53 to roll towards the second end 55 of each of the gravity bars 53, which results in the drive shaft assembly 100 moving primarily in the first horizontal direction while also moving partially in the downward vertical direction while traversing the pair of the gravity bars 53. The second end 55 of each of the gravity bars 53 may include a resting surface 56 arranged transversely relative to the longitudinal direction of the gravity bars 53 for the accumulation of completed drive shaft assemblies 100 following a manufacturing process using the system 10. The gravity bars 53 further include a pair of first stopping mechanisms 57 and a pair of second stopping mechanisms 58. The stopping mechanisms 57, 58 are configured to be selectively actuated between a stopping position and an open position, wherein the stopping position includes the stopping mechanisms 57, 58 arranged transversely to the longitudinal direction of the gravity bars 53 or in a position vertically above an upper surface of the gravity bars 53, while the open position includes the stopping mechanisms 57, 58 arranged substantially parallel to the gravity bars 53 or in a position vertically below the upper surface of the gravity bars 53. The stopping mechanisms 57, 58 are shown in FIG. 1 as being pivotable about an end thereof for adjusting the stopping mechanisms 57, 58 between the open position and the stopping position, but it should be understood that the stopping mechanisms 57, 58 may use any suitable structure and motion for selectively positioning the stopping mechanisms 57, 58 such as a component that is linearly displaced to provide interference for stopping a rolling position of the drive shaft assembly 100 as it traverses the pair of the gravity bars 53. Each of the stopping mechanisms 57, 58 may be actuated by a suitable actuator such as an electric servo motor, a pneumatic actuator, a hydraulic actuator, or other actuators, for example.

The frame 52 further supports a vertical displacement platform 60. The vertical displacement platform 60 is configured to be displaceable relative to the stationary frame 52 in the vertical direction. The embodiment shown in FIG. 1 includes the frame 52 having a plurality of vertical guide rails 59 for making sliding engagement with a plurality of sliders 61 projecting from side surfaces of the vertical displacement platform 60. The vertical position of the vertical displacement platform 60 is shown in FIG. 1 as controlled by a plurality of vertically oriented lead screw conveyer mechanisms extending through the vertical displacement platform 60. However, it should be understood that the vertical position of the vertical displacement platform 60 may be controlled by any suitable actuator and kinematics system without departing from the scope of the present invention.

The vertical displacement platform 60 includes a pair of first horizontal guide rails 62 disposed on an upper surface thereof and adjacent opposing sides of the vertical displacement platform 60. The first horizontal guide rails 62 extend in the first horizontal direction parallel to the direction of travel of the gripping device 36 relative to the transport rail 34. The first horizontal guide rails 62 are configured for sliding engagement with a plurality of sliders 71 disposed on an underside of a horizontal displacement platform 70. The horizontal displacement platform 70 is accordingly configured to be displaced in the first horizontal direction relative to the vertical displacement platform 60. The horizontal position of the horizontal displacement platform 70 relative to the vertical displacement platform 60 may be selectively adjusted by any suitable actuator and kinematics system without departing from the scope of the present invention, such as a lead screw conveyer mechanism.

Figure 2:
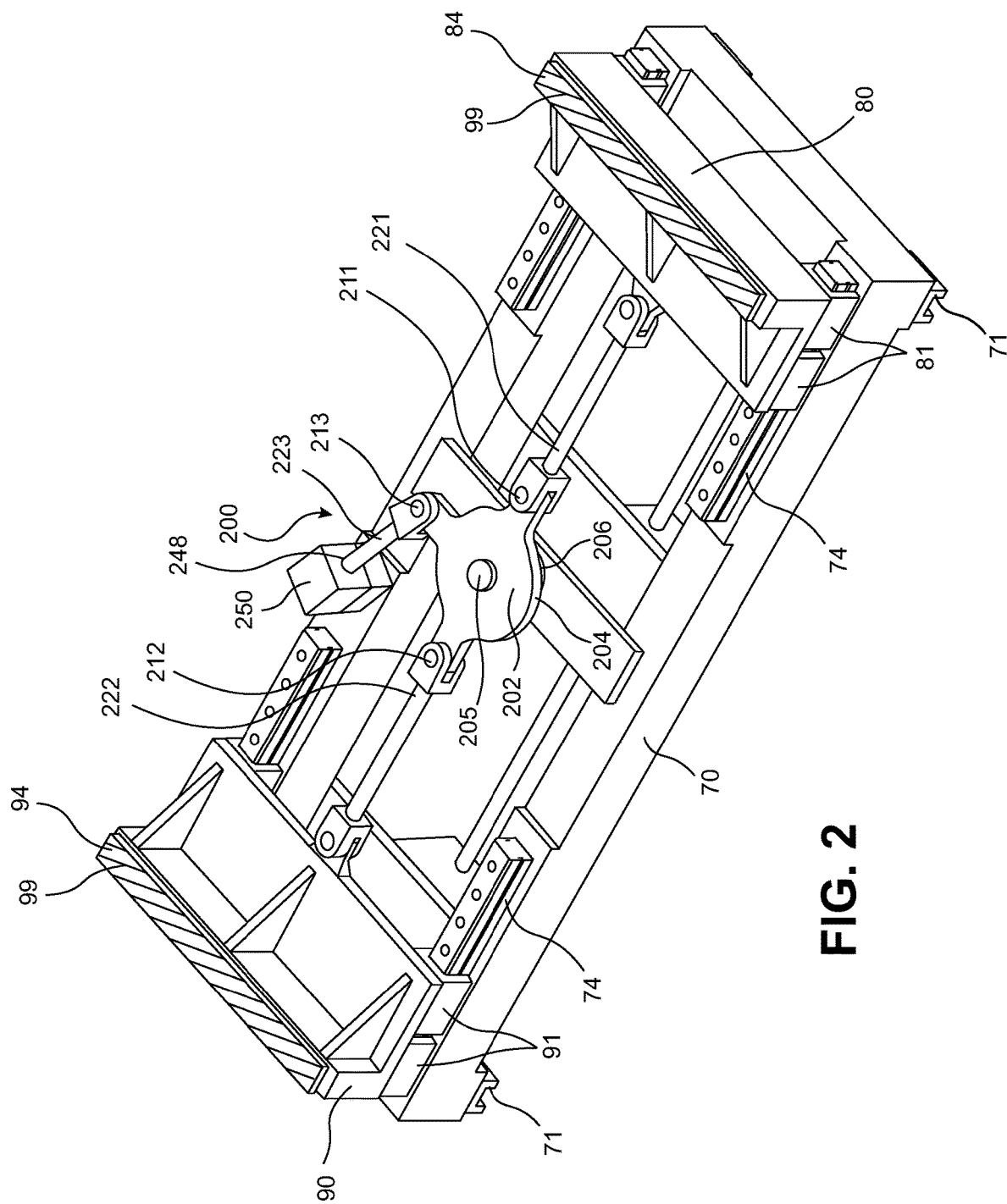
FIG. 2 is a perspective view of a pair of knurling plate supporting platforms of the integrated welding and knurling system of FIG. 1.

Referring now to FIG. 2, the horizontal displacement platform 70, a first knurling platform 80, and a second knurling platform 90 are shown in isolation to better illustrate the components thereof. The horizontal displacement platform 70 includes an upper surface having a first pair of second horizontal guide rails 74 disposed thereon adjacent a first end of the horizontal displacement platform 70 and a second pair of the second horizontal guide rails 74 disposed thereon adjacent an opposing second end of the horizontal displacement platform 70. The pairs of the second horizontal guide rails 74 extend in parallel to each other in a horizontal direction perpendicular to the first horizontal direction, wherein this perpendicular direction is hereinafter referred to as the second horizontal direction. An underside of the first knurling platform 80 includes a plurality of sliders 81 configured for sliding engagement with one pair of the second horizontal guide rails 74 to cause the first knurling platform 80 to be selectively displaced in the second horizontal direction relative to the horizontal displacement platform 70. An underside of the second knurling platform 90 includes a plurality of sliders 91 configured to make sliding engagement with another pair of the second horizontal guide rails 74 to cause the second knurling platform 90 to be selectively displaced in the second horizontal direction relative to the horizontal displacement platform 70.

The first knurling platform 80 includes a first knurling plate 84 formed thereon. The first knurling plate 84 extends longitudinally in the first horizontal direction parallel to the motion of the horizontal displacement platform 70 relative to the vertical displacement platform 60. The second knurling platform 90 includes a second knurling plate 94 formed thereon and extending longitudinally in the first horizontal direction in parallel to the first knurling plate 84. The first and second knurling plates 84, 94 may be formed from a material having a suitable strength and hardness for plastically deforming an outer surface of the weld of the drive shaft assembly 100 during a knurling operation without causing deformation or damage to the knurling plates 84, 94. The first and second knurling plates 84, 94 may include a textured surface for leaving a desired pattern of impressions or indentations in the outer surface of the drive shaft assembly 100. For example, as shown in FIG. 2, the first and second knurling plates 84, 94 are shown as having a plurality of ridges 99 extending transversely relative to the longitudinal direction of each of the knurling plates 84, 94 for forming a plurality of spaced apart diagonally extending impressions in the outer surface of the drive shaft assembly 100.

An adjustment mechanism 200 simultaneously controls a position of each of the knurling plates 84, 94 relative to the second horizontal direction by adjusting a position of each of the knurling platforms 80, 90 relative to the second horizontal guide rails 74 secured to the horizontal displacement platform 70. The adjustment mechanism 200 includes a central plate 202 having an outer surface 204 with a substantially circular shape and a centrally located axis of rotation 205. The axis of rotation 205 may be defined by a shaft 206 rotatably coupled to a central portion of the horizontal displacement platform 70. The central plate 202 includes a first pivoting joint 211, a second pivoting joint 212, and a third pivoting joint 213. The first pivoting joint 211 is angularly displaced from the second pivoting joint 212 by about 180 degrees about the outer surface 204 of the central plate 202 relative to the axis of rotation 205 thereof. The third pivoting joint 213 is angularly displaced from each of the first pivoting joint 211 and the second pivoting joint 212 by about 90 degrees about the outer surface 204 of the central plate 202 relative to the axis of rotation 205 thereof. A first link 221 includes a first end pivotally coupled to the first pivoting joint 211 and a second end pivotally coupled to the first knurling platform 80. A second link 222 includes a first end pivotally coupled to the second pivoting joint 212 and a second end pivotally coupled to the second knurling platform 90. A third link 223 includes a first end pivotally coupled to the third pivoting joint 213 and a second end slidably received within an opening 248 formed within an actuator 250. The actuator 250 is configured to rotate about a vertically oriented axis of rotation in reaction to an extension or retraction of the third link 223 within the opening 248 thereof.

The actuator 250 is configured to selectively control an extension of the third link 223 into and out of the opening 248 in a manner causing the central plate 202 to selectively rotate about the axis of rotation 205 thereof. The adjustment mechanism 200 is shown in FIG. 2 as being at a position wherein the third link 223 is maximally inserted into the opening 248 of the actuator 250 and the first and second knurling platforms 80, 90 are at a maximum distance from each other with respect to the second horizontal direction. From this position, any further movement of the third link 223 out of and away from the opening 248 of the actuator 250 causes the third link 223 to push the central plate 202 to rotate about the axis of rotation 205 thereof (in a clockwise direction from the perspective of FIG. 2). The diametrically opposed positions of the first and second pivoting joints 211, 212 results in a kinematic relationship wherein rotation of the central plate 202 about the axis of rotation 205 results in the first and second pivoting joints 211, 212 moving an equal distance with respect to the second horizontal direction while moving in opposing directions. This equal and opposite motion of each of the pivoting joints 211, 212 causes the first knurling platform 80 and the second knurling platform 90 to be displaced equal distances in the second horizontal direction towards the centrally located central plate 202 while sliding relative to the horizontal guide rails 74. The adjustment mechanism 200 accordingly provides for an adjustment of the knurling apparatus 50 depending on a longitudinal length of the drive shaft assembly 100 subjected to the knurling operation by adjusting the position of both of the knurling platforms 80, 90 simultaneously.

The adjustment mechanism 200 may alternatively be formed devoid of the actuator 250, the third pivoting joint 213, and the third link 223. Instead, the shaft 206 of the central plate 202 may be operatively engaged with a rotary actuator such as an electric servo motor. The rotary actuator is accordingly configured to selectively rotate the central plate 202 about the axis of rotation 205 thereof to a desired rotational position associated with a desired spacing present between the first and second knurling plates 84, 94 in the same manner as the adjustment mechanism 200 shown in FIG. 2. One skilled in the art should appreciate that alternative kinematic relationships may be used to selectively rotate the central plate 202 in accordance with the desired spacing between the first and second knurling plates 84, 94.

A third knurling platform 95 having a third knurling plate 96 and a fourth knurling platform 97 having a fourth knurling plate 98 are coupled to an underside of a portion of the frame 52 extending over the vertical displacement platform 60. The third and fourth knurling plates 96, 98 are positioned above and oriented to face downwardly towards the first and second knurling plates 84, 94 while also extending in parallel with respect to the first and second knurling plates 84, 94. The third and fourth knurling platforms 95, 97 have substantially the same relationship relative to the underside of the portion of the frame 52 from which they depend as do the first and second knurling platforms 80, 90 with respect to the horizontal displacement platform 70, including sliding engagement between a plurality of horizontally arranged guide rails disposed on the underside of the frame 52 and a plurality of sliders disposed on upper surfaces of the third and fourth knurling platforms 95, 97, wherein the horizontally arranged guide rails extend in the second horizontal direction.

A position of the third and fourth knurling platforms 95, 97 with respect to the second horizontal direction is similarly adjusted by an adjustment mechanism 300 (partially shown in FIG. 1) including a central rotatable plate (not shown) having a kinematic relationship with an actuator and each of the knurling platforms 95, 97 in similar fashion to that described with reference to the adjustment mechanism 200. The underside of the frame 52 also differs from the horizontal displacement platform 70 in that the underside of the frame 52 remains stationary with respect to the first horizontal direction, hence the third and fourth knurling platforms 95, 97 are restricted from translating in the first horizontal direction in contrast to the first and second knurling platforms 80, 90.

The third and fourth knurling plates 96, 98 may include a pattern of surface features for forming a textured pattern on the outer surface of the drive shaft assembly 100. For example, one skilled in the art should appreciate that the third and fourth knurling plates 96, 98 may include a pattern of the ridges 99 that are oriented transversely relative to the third and fourth knurling plates 96, 98 in order to cooperate with the ridges 99 of the first and second knurling plates 84, 94 to form a grid-like pattern on the outer surface of the drive shaft assembly 100 during the knurling operation. However, any pattern of the ridges 99 suitable for eliminating the objectionable surface features and improving an attractiveness of the drive shaft assembly 100 may be used without departing from the scope of the present invention.

The portion of the frame 52 overhanging the vertical displacement platform 70 further includes a pair of alignment mechanisms 5, wherein one of the alignment mechanisms 5 is formed to each of the opposing sides of the gravity bars 53. Each of the alignment mechanisms 5 includes a planar surface 6 that is pivotally coupled to the frame 52. An axis of rotation of each of the alignment mechanisms 5 is arranged in parallel to the first horizontal direction. Each of the alignment mechanisms 5 includes the planar surface 6 thereof normally arranged substantially parallel to the ground surface. During use, each of the alignment mechanisms 5 is actuated to pivot the corresponding planar surface 6 away from the position parallel to the ground surface until the planar surface is arranged perpendicular to the ground surface and parallel to the first horizontal direction. The alignment mechanisms 5 are configured to apply a pair of inwardly and oppositely directed forces to opposing ends of a corresponding one of the drive shaft assemblies 100 until the planar surfaces 6 are arranged in parallel to each other, thereby establishing a desired alignment of the drive shaft assembly 100 in the second horizontal direction. Each of the alignment mechanisms 5 may be actuated by a suitable actuator such as an electric servo motor, as one non-limiting example.

One skilled in the art should further appreciate that the alignment of each of the drive shaft assemblies 100 relative to the second horizontal direction may be accomplished using alternative structures and methods without departing from the scope of the present invention. For example, the alignment mechanisms may instead be presented as a pair of oppositely arranged linear displacement mechanisms coupled to the frame 52 adjacent the knurling plates 84, 94, 96, 98 for applying inward forces to opposite ends of the drive shaft assembly 100. Alternatively, one or more of the knurling platforms 80, 90, 95, 97 may include a planar surface arranged perpendicular to the ground surface and configured to engage one end of the drive shaft assembly 100, wherein an adjustment of the corresponding knurling platform 80, 90, 95, 97 by means of one of the associated adjustment mechanisms 200, 300 causes the planar surface to move inwardly towards the end of the drive shaft assembly 100. The planar surface may then push the drive shaft assembly 100 to a desired position relative to the second horizontal direction before retracting slightly to avoid interference between the planar surface and the drive shaft assembly 100 during a knurling operation.

When the integrated welding and knurling system 10 is in use, the tube 102 is positioned within the locating feature 22 of the welding apparatus 20 wherein each opposing end of the tube 102 engages a suitable end fitting 103. A welding operation is the carried out using the welding apparatus 20 to mechanically join the end fittings 103 to the ends of the tube 102, thereby forming a seam 106 and a weld curl 107 adjacent each end of the resulting drive shaft assembly 100.

As shown in FIG. 1, the gripping device 36 may already be in gripping engagement with the tube 102 during the welding operation or may be disposed immediately adjacent the tube 102 in order to grip the tube 102 immediately after the welding operation. Once the welding operation is complete, the controller or the operator associated with operation of the system 10 determines that the resulting drive shaft assembly 100 is to be securely gripped by the gripping device 36 and moved away from the welding apparatus 20 in the vertical direction by means of the vertical displacement mechanism 37. The gripping device 36 is then shuttled along the transport rail 34 in the first horizontal direction to transport the drive shaft assembly 100 to a position above the pair of the gravity bars 53.

Figure 3:
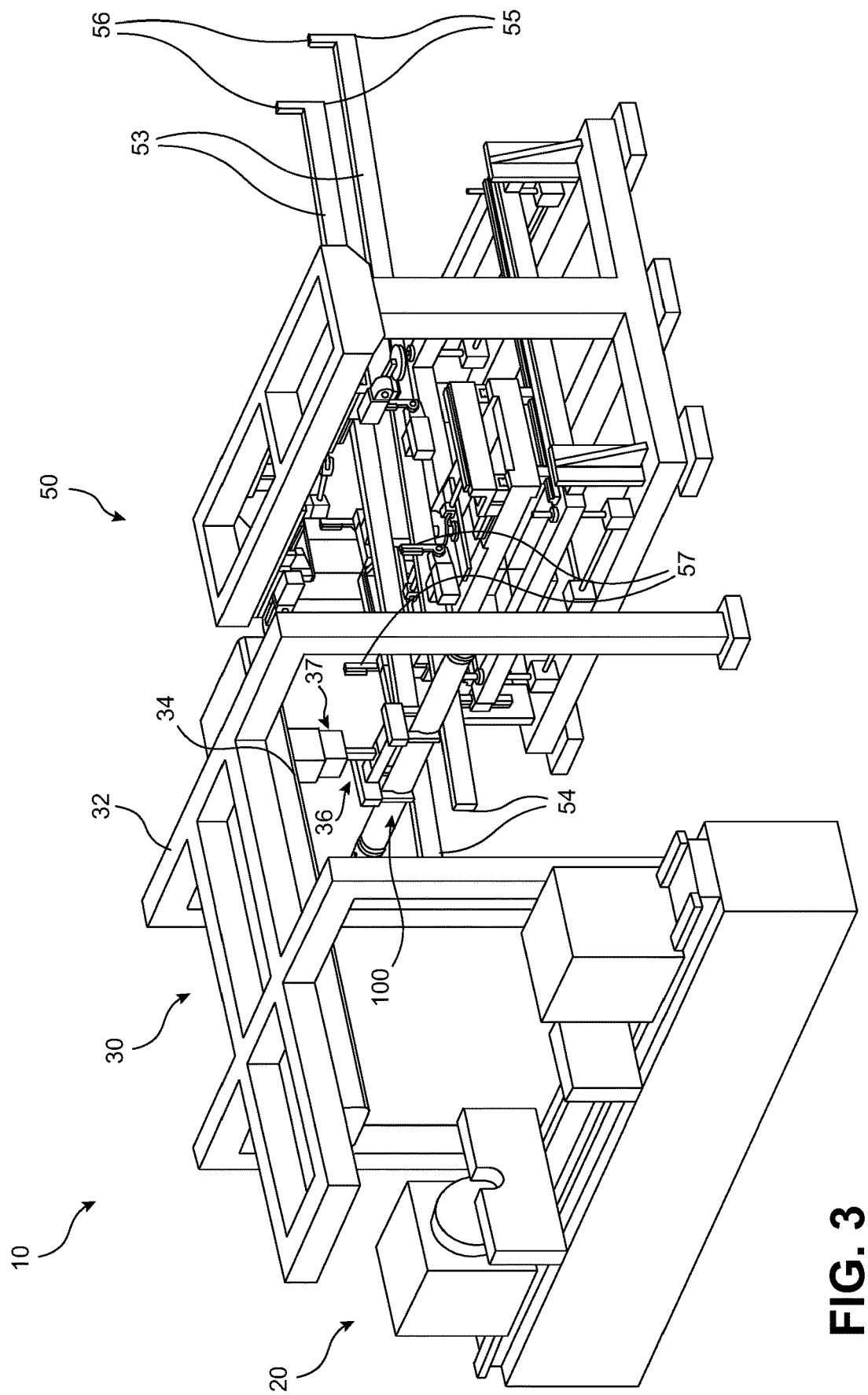
FIG. 3 is a perspective view of the integrated welding and knurling system during a step of transporting the drive shaft assembly to a knurling apparatus of the integrated welding and knurling system.
Figure 4:
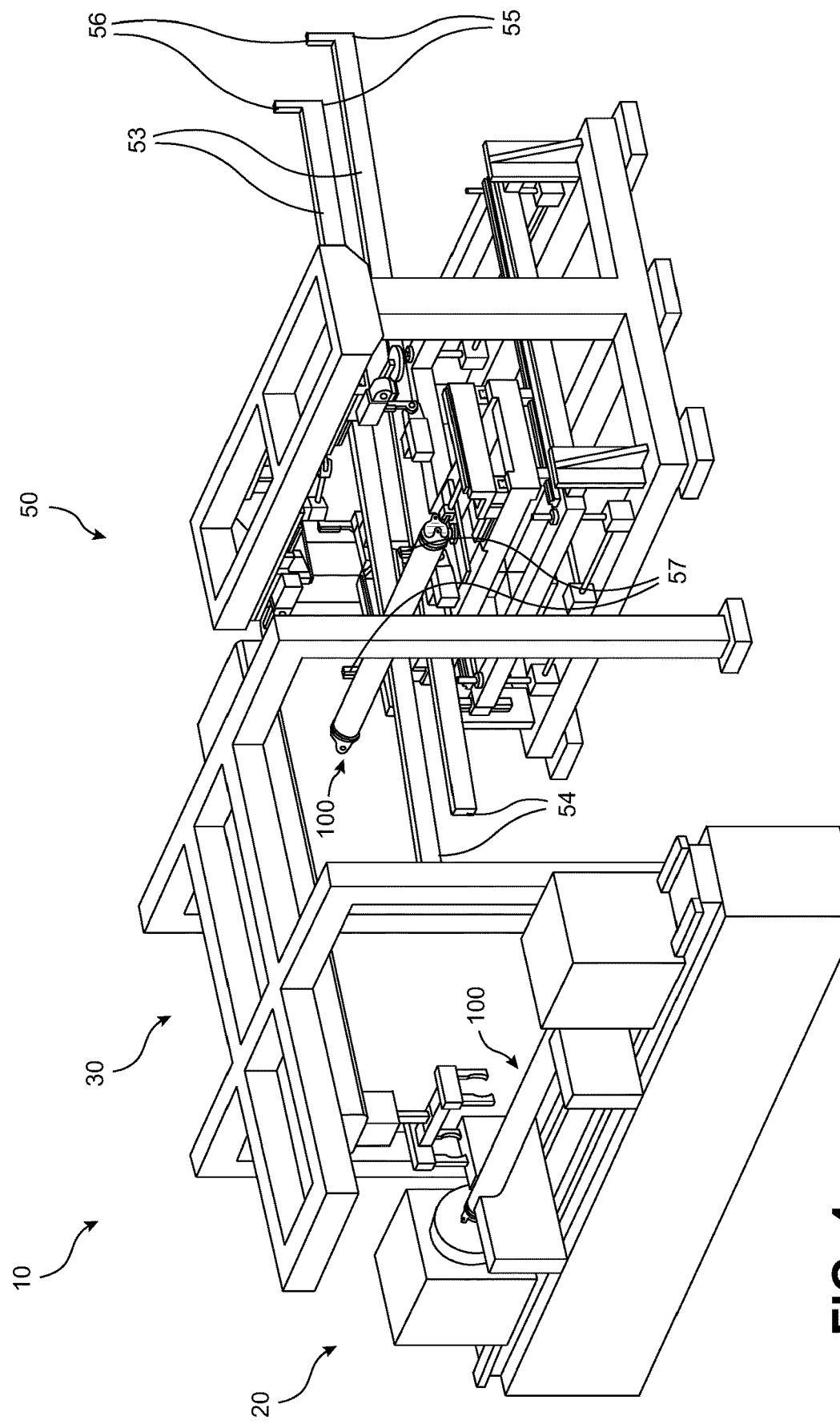
FIG. 4 is a perspective view of the integrated welding and knurling system wherein the drive shaft assembly is resting on a pair of gravity bars and against a first pair of stopping mechanisms.

As shown in FIG. 3, the gripping device 36 lowers the drive shaft assembly 100 until the drive shaft assembly 100 is disposed on the pair of the gravity bars 53 adjacent the first end of each of the gravity bars 53. The gripping device 36 releases the grip on the drive shaft assembly 100 at a position uphill of the pair of the first stopping mechanisms 57, wherein the pair of the first stopping mechanisms 57 are already actuated to the stopping position based on a determination made by the controller or the operator. The drive shaft assembly 100 is then able to roll down the pair of the gravity bars 53 before coming to rest when engaging each of the first stop mechanisms 57, as shown in FIG. 4.

The first stop mechanisms 57 may be configured to remain in the stopping position until the controller or operator determines that the drive shaft assembly 100 is ready to proceed to the next manufacturing step based on timed schedule or the condition of the remainder of the system 100. For example, the first stop mechanisms 57 may be used to hold the drive shaft assembly 100 in place while the knurling apparatus 50 is performing a knurling operation on another previously formed drive shaft assembly, thereby allowing the transport apparatus 30 to shuttle the gripping device 36 back towards the welding apparatus 20 after having dropped off the drive shaft assembly 100 adjacent the first stopping mechanisms 57. The use of the first stopping mechanisms 57 accordingly improves an efficiency of the system 10 be eliminating down time during certain operational steps performed by the system 10.

Figure 5:
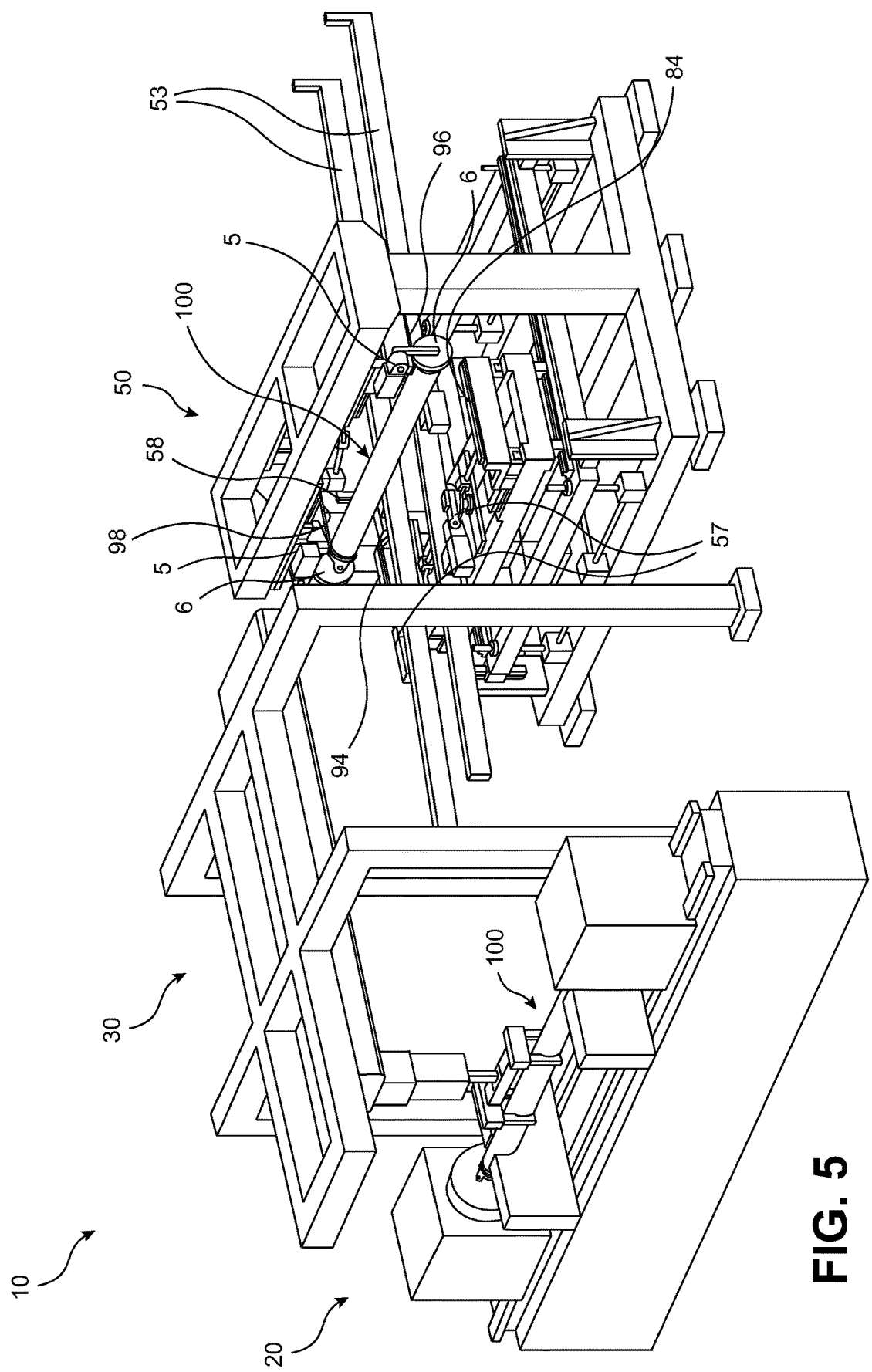
FIG. 5 is a perspective view of the integrated welding and knurling system wherein the drive shaft assembly is positioned by a pair of cooperating alignment mechanisms for aligning the drive shaft assembly relative to first and second pairs of knurling plates.

The controller or operator then determines that the drive shaft assembly 100 is ready for the knurling operation and actuates the first stopping mechanisms 57 to the open position for allowing the drive shaft assembly 100 to continue to roll down the pair of the gravity bars 53. The drive shaft assembly 100 rolls until encountering the pair of the second stopping mechanisms 58, which are again already actuated to the stopping position by a determination of the controller or the operator, as shown in FIG. 5. The rolling of the drive shaft assembly 100 against the second stopping mechanisms 58 allows for a longitudinal axis of the drive shaft assembly 100 to be properly oriented in the second horizontal direction for the ensuing knurling operation.

Once abutting the second stopping mechanisms 58, the controller or operator determines that the alignment mechanisms 5 are to be actuated to reposition the planar surfaces 6 into parallel relationship indicating that the drive shaft assembly 100 is properly aligned in the second horizontal direction. Additionally, the controller or operator may further require an adjustment of one or both of the adjustment mechanisms 200, 300 to properly space the first and third knurling plates 84, 96 from the second and fourth knurling plates 94, 98 in the second horizontal direction to account for a length of the drive shaft assembly 100. For example, a drive shaft assembly 100 having a shorter distance between adjacent weld curls thereof than shown in the figures may require an adjustment of the adjustment mechanisms 200, 300 to more closely space the knurling plates 84, 94, 96, 98 with respect to the second horizontal direction to ensure proper alignment of the drive shaft assembly 100 during the knurling operation.

The aligning of the drive shaft assembly 100 in the second horizontal direction results in a first weld curl 107 formed at the first end of the drive shaft assembly 100 disposed between a portion of the first knurling plate 84 and a portion of the third knurling plate 96 while a second weld curl 107 formed at the second end of the drive shaft assembly 100 is disposed between a portion of the second knurling plate 94 and a portion of the fourth knurling plate 98. More specifically, the drive shaft assembly 100 is positioned immediately below a first end portion of each of the third and fourth knurling plates 96, 98 and immediately above a second end portion of each of the first and second knurling plates 84, 94. When in this position, the controller or operator then determines that the vertical displacement platform 60 is to be displaced in the upward vertical direction to eventually cause the first knurling plate 84 and the second knurling plate 94 to contact an underside of the drive shaft assembly 100.

Figure 6:
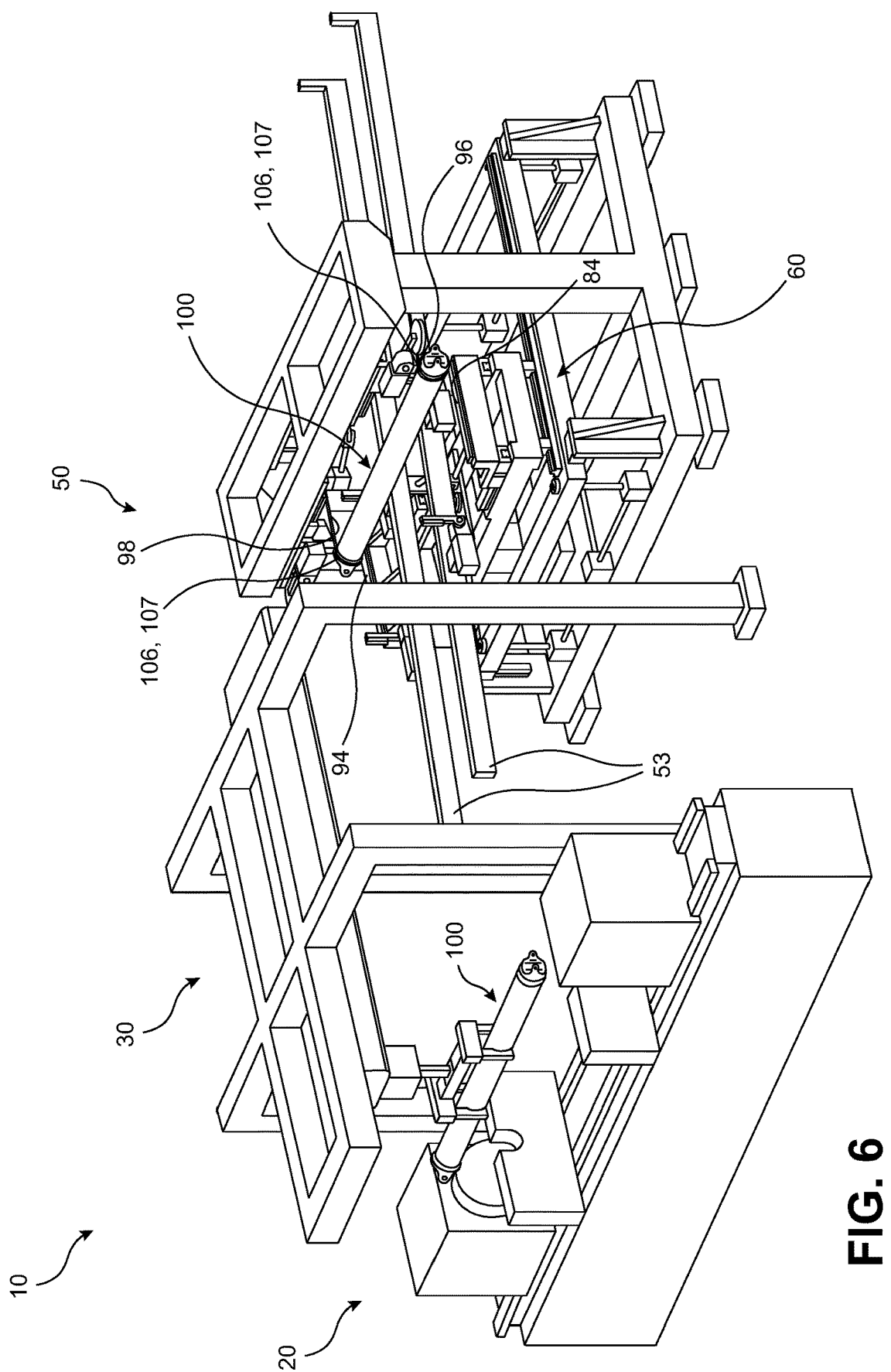
FIG. 6 is a perspective view of the integrated welding and knurling system wherein a lifting platform is raised to position the drive shaft assembly between the first and second pairs of the knurling plates for performing a knurling operation.

The vertical displacement platform 60 continues to move vertically upwardly until the drive shaft assembly 100 is lifted away from the gravity bars 53 and into engaging contact with both the first and second knurling plates 84, 94 approaching from below the drive shaft assembly 100 and the third and fourth knurling plates 96, 98 disposed above the drive shaft assembly 100, thereby securing a fixed position of the drive shaft assembly 100 relative to each of the knurling plates 84, 94, 96, 98, as illustrated in FIG. 6. Additionally, each of the weld curls 107 having one of the seams 106 is positioned between opposing faces of an oppositely arranged pair of the knurling plates 84, 94, 96, 98.

Figure 7:
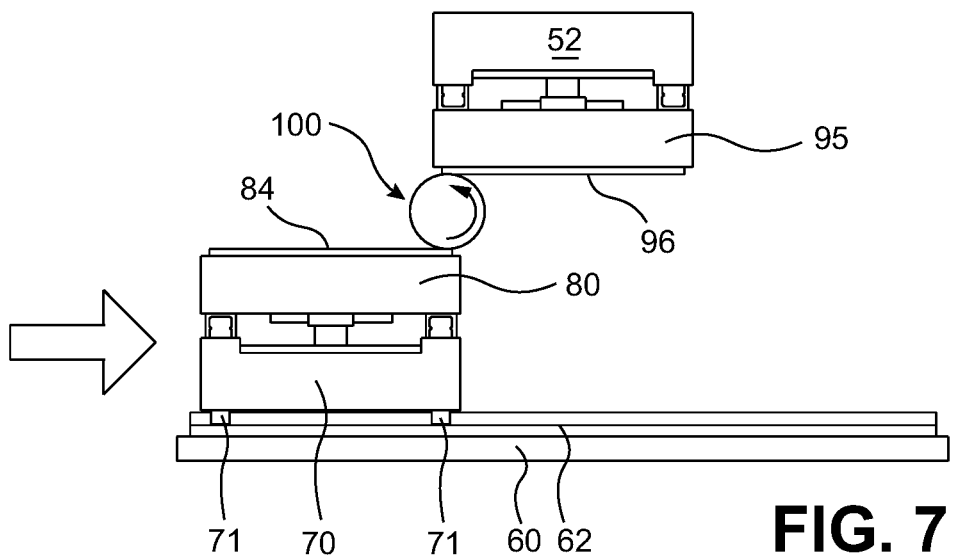
FIGS. 7-9 are fragmentary side elevational views illustrating a portion of the integrated welding and knurling system at various stages of a knurling operation performed on the drive shaft assembly.
Figure 8:
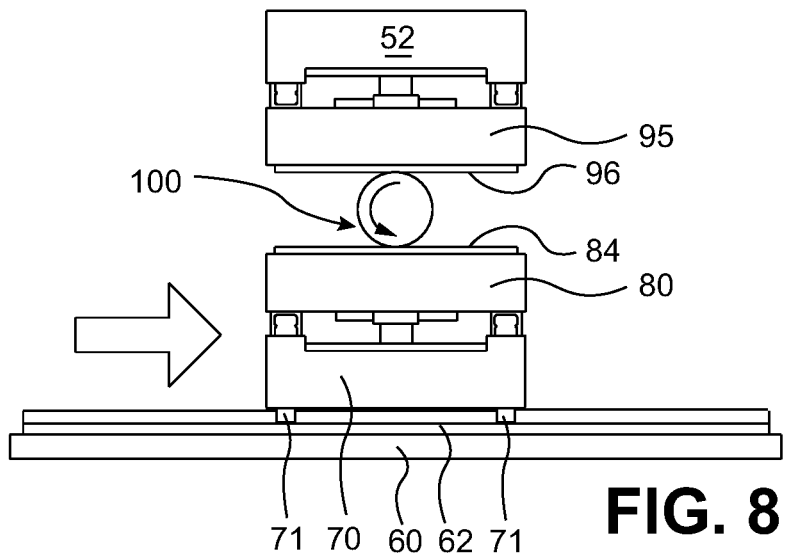
Figure 9:
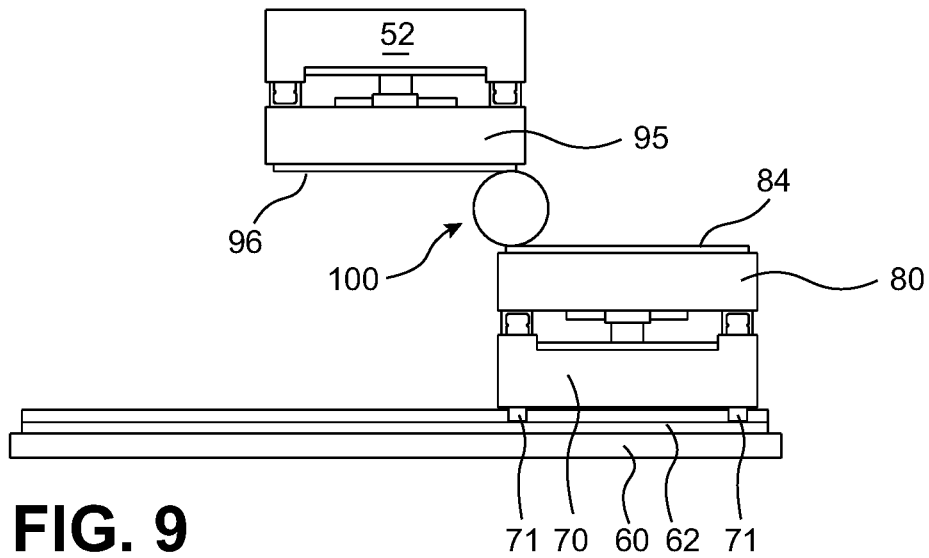

FIGS. 7-9 illustrate a portion of the vertical displacement platform 60, one of the first horizontal guide rails 62 disposed on the vertical displacement platform 60, the horizontal displacement platform 70, the first knurling platform 80, the third knurling platform 95, and a portion of the frame 52 in isolation to better illustrate the relationship between the drive shaft assembly 100 and the oppositely facing first and third knurling plates 84, 96 during a representative knurling operation. The third knurling plate 96 remains stationary with respect to the first horizontal direction as a result of the third and fourth knurling platforms 95, 97 being coupled to the frame 52. The vertical displacement platform 60 is actuated to be urged in the upward vertical direction until a suitable force is generated on the drive shaft assembly 100 between the opposing first and third knurling plates 84, 96 for causing the ridges 99 present on the first and third knurling plates 84, 96 to deform an outer surface of the drive shaft assembly 100, and more specifically a portion of the outer surface of the drive shaft assembly 100 defining one of the weld curls 107 formed adjacent one end of the drive shaft assembly 100. This upward force is continually applied to the drive shaft assembly 100 while the horizontal displacement platform 70 is displaced in the first horizontal direction relative to the frame 52 by sliding along the horizontal guide rails 62. The displacement of the horizontal displacement platform 70 in the first horizontal direction causes the drive shaft assembly 100 to roll between the first and third knurling plates 84, 96 as the first knurling platform 80 moves relative to the stationary third knurling platform 95 in the first direction. It is further understood that the opposing weld curl 107 of the drive shaft assembly 100 simultaneously rolls between the second and fourth knurling plates 94, 98 during the knurling operation to form the knurled surface at each of the weld curls 107 of the drive shaft assembly 100.

FIG. 8 illustrates the knurling operation after the drive shaft assembly 100 has undergone about 180 degrees of rotation while FIG. 9 illustrates a conclusion of the knurling operation after the drive shaft assembly 100 has undergone about 360 degrees of rotation, thereby ensuring that an entire circumference of each of the weld curls 107 is subjected to the knurling operation.

After the knurling operation is complete, the vertical displacement platform 60 is actuated to be displaced in the downward vertical direction to cease the engagement of the drive shaft assembly 100 with the third and fourth knurling plates 96, 98 while the drive shaft assembly 100 continues to rest on the first and second knurling plates 84, 94. The vertical displacement platform 60 continues to move in the downward vertical direction until the drive shaft assembly 100 again rests on the pair of the gravity bars 53, wherein the drive shaft assembly 100 is free to roll to the end of the gravity bars 53 before stopping at the resting surfaces 56. The completed drive shaft assembly 100 may then be removed from the resting position at the second end 55 of the gravity bars 53.

Figure 11:
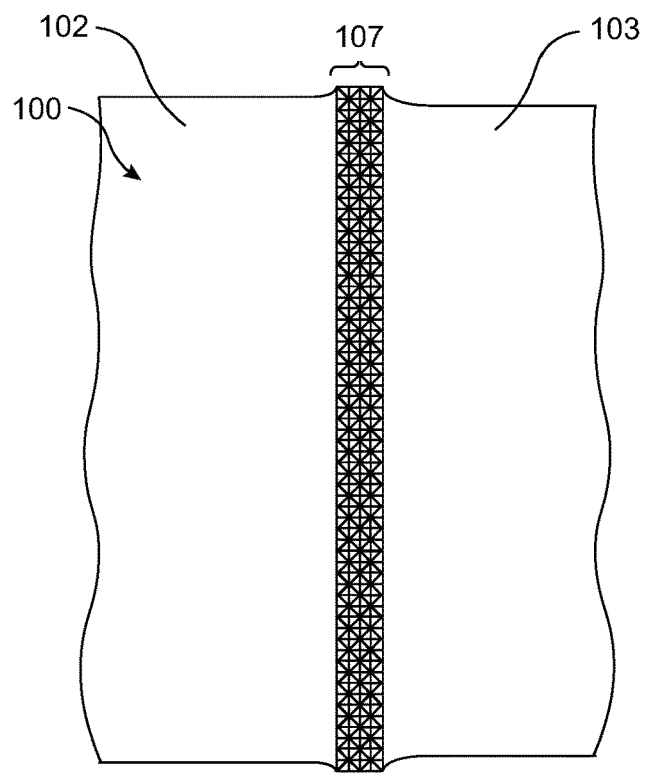
FIG. 11 is a fragmentary side elevational view of a weld curl of a drive shaft assembly after undergoing a knurling process as shown and described herein.

Referring now to FIG. 11, an exemplary drive shaft assembly 100 having a knurled weld curl 107 is shown. The formation of the knurled weld curl 107 advantageously eliminates the incidence of the objectionable features that may be present at the weld curl 107 immediately following one of the welding operations. The knurling operation removes or inwardly deforms the objectionable features in a manner wherein the drive shaft assembly 100 has an attractive appearance that is also easy to grip. The removal of the objectionable features 110 further prevents an incidence of such objectionable features 110 injuring a user of the system 10 or getting snagged on an article of clothing of the user, thereby ensuring safe handling of the resulting drive shaft assembly 100.

As can be seen in FIGS. 4-6, after having transported one of the drive shaft assemblies 100 away from the welding apparatus 20 and to the gravity bars 53, the gripping device 36 may immediately be transported back towards the welding apparatus 20 in order to grip and transport another drive shaft assembly 100 after the drive shaft assembly 100 has undergone a welding operation. The use of the stopping mechanisms 57, 58 accordingly allows for a timing of the system 10 to be optimized for eliminating down time between various steps of the dual welding and knurling operation, thereby increasing an efficiency of the system 10.

One skilled in the art should appreciate that the system 10 may be modified in various ways without significantly altering a manner of operation thereof. For example, any suitable structural relationship may be utilized for causing the first and second knurling platforms 80, 90 to be adjustable in the first horizontal direction and the vertical direction, such as reversing an order of the horizontally displaceable components with the vertically displaceable components. Alternatively, the system 10 is shown and described as including a lower set of the knurling plates as moving horizontally relative to an upper set of stationary knurling plates, but it should be understood that the same relationship may be formed by configuring the upper set of the knurling plates to be displaceable in the first horizontal direction while the lower set of the knurling plates remain stationary. The system 10 may accordingly be modified to alter the order and arrangement of various components capable of linear displacement so long as the system 10 has the desired degrees of freedom for manipulating the drive shaft assembly 100 in accordance with the method disclosed herein.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A drive shaft assembly comprising:
 a first drive shaft component, and
 a second drive shaft component welded to the first drive shaft component at a weld joint interface, wherein a weld curl is formed at the weld joint interface when the second drive shaft component is welded to the first drive shaft component, and wherein a portion of an outer surface of the drive shaft assembly corresponding to the weld curl is plastically deformed following completion of the formation of the weld curl, wherein the weld curl projects radially outwardly, wherein the weld curl being plastically deformed includes the weld curl being plastically deformed radially inwardly, wherein the weld curl being plastically deformed radially inwardly includes the weld curl being compressed radially inwardly, and wherein the weld curl being compressed radially inwardly includes the drive shaft assembly being rolled relative to at least one surface engaging the weld curl.

2. The drive shaft assembly of claim 1, wherein the weld curl being plastically deformed eliminates surface irregularities formed on the weld curl when the second drive shaft component is welded to the first drive shaft component.

3. The drive shaft assembly of claim 1, wherein the weld curl being plastically deformed results in the portion of the outer surface of the drive shaft assembly corresponding to the weld curl being knurled to include a plurality of inwardly deformed depressions.

4. The drive shaft assembly of claim 3, wherein the inwardly deformed depressions include a first depression arranged transverse to a second depression.

5. The drive shaft assembly of claim 4, wherein the first depression intersects the second depression.

6. The drive shaft assembly of claim 5, wherein the first depression passes through the second depression.

* * * * *